April 4, 1961 L. GREBE 2,977,629
PROCESSING OF MEAT AND THE LIKE
Filed Sept. 6, 1955 7 Sheets-Sheet 1

INVENTOR
LUDWIG GREBE

April 4, 1961   L. GREBE   2,977,629
PROCESSING OF MEAT AND THE LIKE
Filed Sept. 6, 1955   7 Sheets-Sheet 2

INVENTOR
LUDWIG GREBE

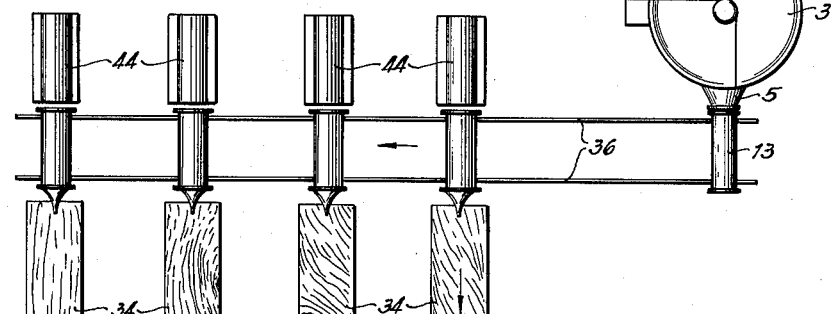
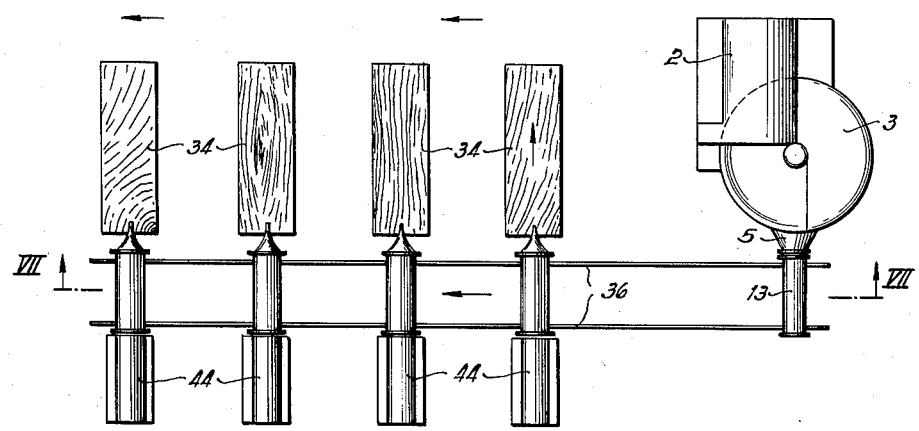
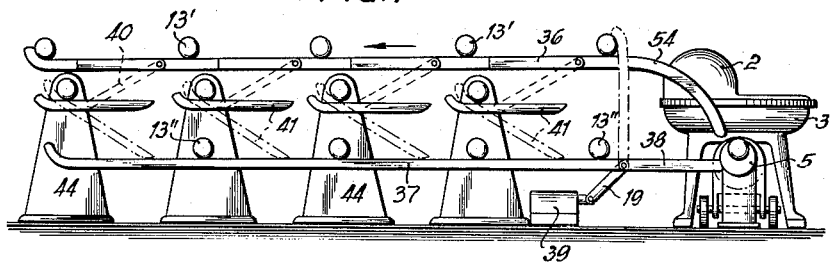

INVENTOR
LUDWIG GREBE

April 4, 1961 L. GREBE 2,977,629
PROCESSING OF MEAT AND THE LIKE
Filed Sept. 6, 1955 7 Sheets-Sheet 5

INVENTOR
LUDWIG GREBE

April 4, 1961 L. GREBE 2,977,629
PROCESSING OF MEAT AND THE LIKE
Filed Sept. 6, 1955 7 Sheets-Sheet 6

INVENTOR
LUDWIG GREBE

April 4, 1961 L. GREBE 2,977,629
PROCESSING OF MEAT AND THE LIKE
Filed Sept. 6, 1955 7 Sheets-Sheet 7

INVENTOR
LUDWIG GREBE

United States Patent Office 2,977,629
Patented Apr. 4, 1961

2,977,629

PROCESSING OF MEAT AND THE LIKE

Ludwig Grebe, Wallau (Lahn), Germany

Filed Sept. 6, 1955, Ser. No. 532,439

Claims priority, application Germany Sept. 6, 1954

3 Claims. (Cl. 17—39)

This invention relates to the processing of food in plastic state, such as meat and like material and more specifically to the production of sausages.

Great difficulty is generally encountered in the production of sausages in that it has been heretofore considered unavoidable that a certain quantity of air should become caught or trapped in the material to be moved for filling same into the guts. Such air, however, should be removed or should be precluded therefrom at the very outset, because durability and preservation of such sausages will be greatly impaired due to the presence of air.

It is therefore an important object of the invention to provide means ensuring substantially complete removal of air from the food material used.

Another object of the invention resides in the provision of means affording handling and processing of the material into sausages in a highly hygienic manner.

The invention more specifically provides for a press for comminuted material attached to a meat cutter, and preferably several receiving containers for compressed material are coordinated with the press, said containers being interchangeably arranged at the discharge end of the press, and said containers forming filling cylinders for direct insertion into and connection with filler means for delivering sausages.

Up to now the material pressed in bales was transported in any suitable container to the sausage fillers, or dispensers, and the operator grasped the bales and thrust them into the filling cylinder connected with the filler means, tamping them uniformly with his fists. However, the entrapment of air in the material could not be avoided, and such air would have to be later removed from the material thus treated.

Depending on whether the material is to be used for cooked or uncooked sausages, the consistency of the material will differ. Material for the production of uncooked sausages is thicker than that for the production of cooked sausages. The consistency of the latter is about that obtained during transition from the solid to the viscous state thereof. Considering this fact the filling cylinders are preferably transported in vertical instead of in horizontal position from the press to the filler and may thus be closed by means of interchangeable covers. In working the material for cooked sausages special stress must be laid on the fact that no air is included in said material. According to the invention this is achieved by the interposition of a vacuum mixing device between the cutter and the press.

The cleanliness prevailing during performance of the process is enhanced by special handling and transportation means provided for the filling cylinders, which means remove the full cylinders from the press and transport them to a preferably horizontal filler, and return the empty cylinders to the press.

Considering the fact that more material can be worked by a meat cutter than by a single sausage filler means, several filler means stations are associated according to this invention with a single cutter connected with a press.

According to one embodiment of the invention a trackway, preferably inclined in downward direction, is provided between the baling press and several filler means, the distance between the rails being sufficiently large so that the filling cylinders may be rolled on them. Preferably, two trackways are arranged in superposition for moving the filling cylinders toward the fillers and for returning same from the latter.

It is therefore another important feature of the invention to provide means contributing to the efficacious and continuous production of sausages, whereby the number of circulating filling cylinders may be chosen according to the amount of material to be worked.

Further features, objects and characteristics of the invention will become apparent from the following description of certain embodiments of the invention in connection with the claims and the attached drawings.

In the drawings:

Fig. 6 is a somewhat diagrammatic plan view of two meat cutters each having a press and a plurality of fillers attached thereto;

Fig. 7 is a sectional view taken on section line shown in Fig. 6 with columns 35 omitted therefrom;

Figure 1:
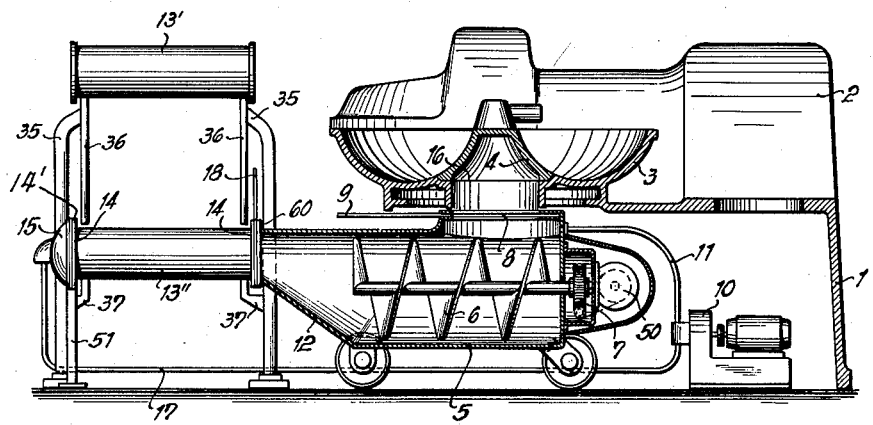
Fig. 1 is a partial sectional view of an apparatus for processing of meat and like food stuff, comprising a meat cutter, a press, and two tracks on which filling cylinders may be rolled.
Figure 2:
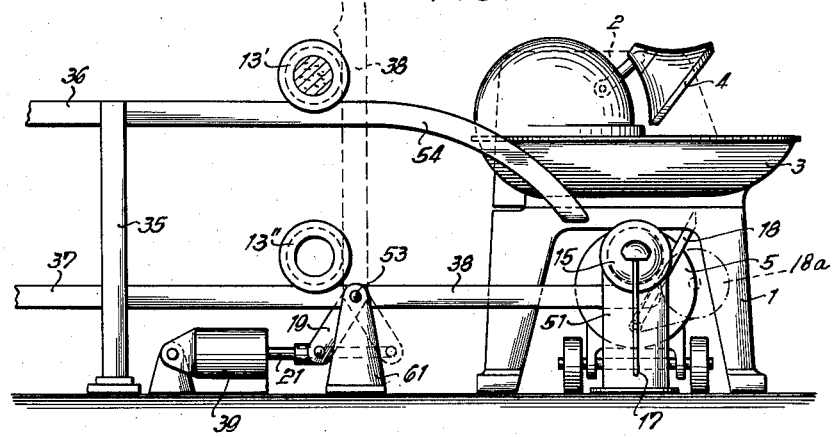
Fig. 2 is a front elevation thereof.

Referring now more particularly to the attached drawings, there is disclosed a frame 1 for a meat cutter 2 which frame is of inverted U-shape and extends beneath the pan-shaped container 3. In its center this container is provided with an aperture 16 over which extends a conical-shaped body 4 which may be swivelled by means (not shown) from a closed position, as illustrated in Fig. 1, into an open position, as depicted in Fig. 2.

A first food processing component, a baling press housing 5, is positioned beneath the frame 1, the filling inlet 8 thereof being situated below the conical body 4. Inlet 8 can be closed by means of a slide 9 which at the same time hermetically seals the interior of the press. Within the housing of the press 5 a screw or worm conveyor 6 is arranged which, at its right hand end in Fig. 1, is driven by an electric motor 50 with a worm gearing 7 interposed therebetween. At the opposite end of the worm the housing 5 is tapered to form a funnel-shaped part 12, having a discharge opening 60.

Connected to the discharge opening 60 is a cylindrical supply container 13", representing a filling cylinder corresponding to a filler device for sausages, which container is interchangeably fixed to its end faces between the discharge opening 60 and a suction head 15 by any conventional quick-acting locking means. The suction head itself is mounted on a standard 51 and connected with a suction pipe 17 leading to the vacuum side of an air pump 10. Suitable gaskets or sealing means 14' are provided at the junction locations of the filling cylinder 13".

Figure 3:
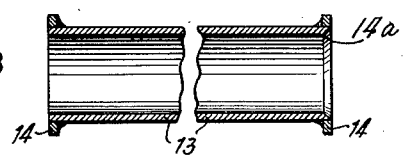
Fig. 3 is a longitudinal section of a filling cylinder.

Moreover, a suction pipe 11 is connected with the press leading equally to the vacuum side of the air pump. A swingable, flat knife 18 is provided in such a way at the location where the filling cylinder is connected to the press that it can be moved in the dividing plane between the discharge opening 60 of the press and the adjacent end face of the filling cylinder. The filling cylinder 13" consists of a pipe-like body with flanges 14 welded to its ends. The right hand opening in Fig. 3 of the cylinder is conically counterbored as at 14a in order to facilitate the introduction of a piston.

Further processing components, in the form of fillers 44 for sausages, are provided in addition to this arrangement of cutter and press (see Figs. 6 and 7). Between the baling press 5 and the fillers two rails or trackways 36, and 37 are provided and are supported at different heights or levels by vertical columns 35 as seen best in Fig. 2. The bottom trackway 37 terminates with its end 38 beneath the filling cylinder 13" which is connected to the discharge opening 60 of the press 5. The end of the trackway 37 can be swivelled upwardly about an axle 53 mounted within a bearing block 61. A lever 19, engaging the rail end 38, is connected with a piston (not shown) through the medium of a piston rod 21 (see Fig. 2). The piston carries out a reciprocating movement within a hydraulic or pneumatic pressure cylinder 39 and thus may impart the aforesaid swivel movement to track end 38.

The end 54 of the trackway 36 terminates in a downward arc. Both trackways are downwardly inclined (not shown) in such a way that the lowermost part of the top trackway 36 is located beyond the last filler apparatus 44 and the lowermost part of the bottom trackway 37 is located near the press 5 (Fig. 7).

Figure 4:
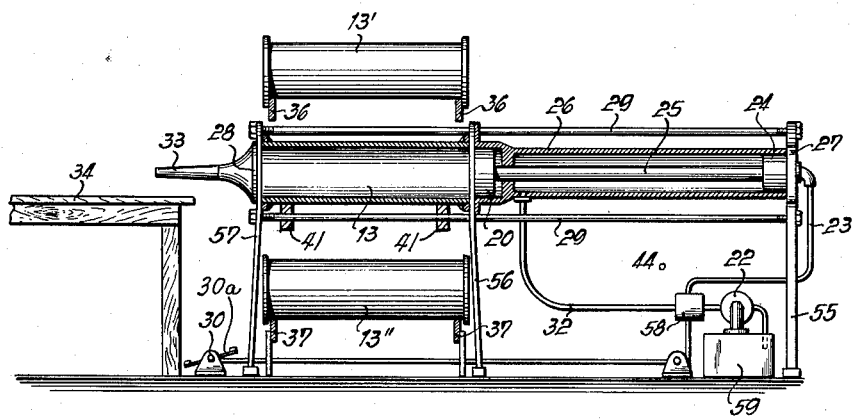
Fig. 4 is a longitudinal section of a filler device for producing sausages.

As illustrated in Fig. 4, a pressure cylinder 26, in which a piston 24 is movable, is arranged between and supported by two frames or standards 55, 56. A pressure medium delivery pipe 23 is connected with the right hand cover 27 of cylinder 26. This pipe 23 leads to a control valve 58 and from there to a pump 22, which in turn communicates with a storage container 59 for the pressure medium. At the opposite end of the cylinder 26 another pressure medium delivery pipe 32 is attached which leads through the control valve 58 to the pump 22.

The control valve 58 is actuated by a foot-operated switch 30 and through the intermediary of a lever system 30a. A cylinder filled with material is fixed between frames 56, 57 by quick-acting locking means, similar to those referred to in connection with the discharge opening 60 of the baling press, and with the suction head 15. The outer frames or standards 55, 57 of the filler apparatus 44 are interconnected with each other by tie rods or struts 29. A plate 28 terminating in a mouth piece 33 is supported by the frame 57 and forwardly of the adjacent discharge opening of the cylinder 13 to be emptied.

Figure 5:
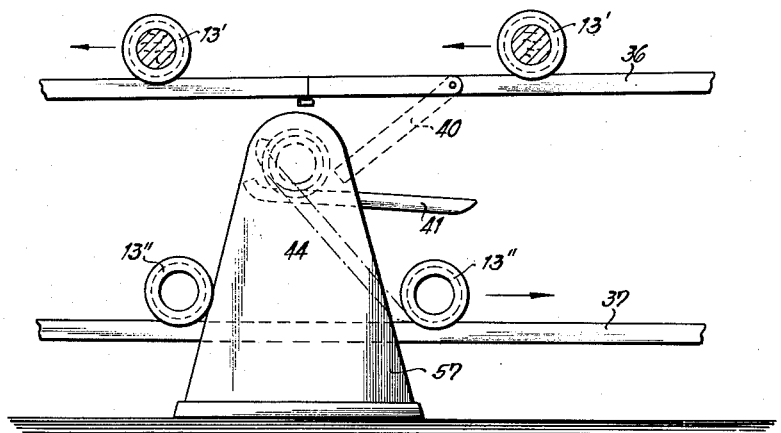
Fig. 5 is a front elevation of said filler device with portions including a plate and foot-operated switch being omitted.

A piston 20 is arranged for sliding movement within an enlarged part of the pressure cylinder 26 and at the inner end of the fixed filled cylinder 13. The diameter of the piston 20 corresponds to the inside diameter of the cylinder 13. The piston 20 is connected with the piston 24 through piston rod 25 and moves within the pressure cylinder 26. Trackway 36 is located above said filler apparatus 44, and on it arrive the filled cylinders 13' coming from the press (Fig. 5). Between the cylinders 13 and the floor there extends lower trackway 37 located between the frames 56, 57, and on it empty cylinders 13" are moved for return to the press. Close to the filler apparatus 44 a table 34 is set up to receive the sausages discharged from mouth piece 33 for further treatment.

On the top trackway 36 track arms 40 swivelly supported to swing in downward direction are provided forwardly of the filler apparatus 44 as seen in the direction of the movement of the filling cylinders. The track arms 40 swing down when a cylinder 13' rolls over same, and thus allow the cylinder to roll between the frames 56, 57 of a respective filler apparatus. A pair of levers 41 which can also be swivelled in downward direction is arranged below the cylinder 13', and on said levers 41 the emptied cylinders 13" roll down onto the trackway 37 beneath it.

Moreover, locking means (not shown) are provided on the top trackway 36 for bolting each pair of track arms 40, while a filling cylinder is still registered with the respective filler therebelow.

The operation according to the invention is as follows: After the material has been comminuted and, if necessary, mingled in the pan-shaped container 3 in a known manner, the conical body 4 is swivelled into the open position as illustrated in Fig. 2. Through the central aperture 16 of the container 3 the material falls into the press 5, located beneath the container which is dimensioned so as to receive the contents of one container. After the container 3 is emptied, and after the empty filling cylinder 13" is moved into place, the filling hole 8 of the press 5 is closed by means of the aforesaid slide 9 and the air pump 10 is switched on, which through the medium of the suction pipes 11, 17 evacuates the interior of the press 5 and of the filling cylinder 13" and thus removes the air from the material under treatment.

The conveyor 6 compresses the material in the funnel-like narrowed part 12 and then presses it into the filling cylinder 13". Once the filling cylinder is filled up, normal atmospheric pressure is restored inside the press, the bolt (not illustrated) is unlocked and the pressed material is cut off by means of the knife 18 between the filling cylinder 13" and the discharge opening 60 of the press. The filled cylinder 13 is now transported to a filler 44. The rockable end 38 of the bottom trackway 37, reaching below it, is swivelled in upward direction by the piston moving within the pressure cylinder 39, and thus the filling cylinder 13 is lifted over the arcuate end 54 of the top trackway 36 onto the straight track part. As the trackway 37 is inclined in downward direction the full cylinder rolls to a filler 44, whose respective rockable or swingable part 40 remains unlocked.

The flanges 14 of the filling cylinder 13 prevent the latter from slipping off the rails. After the filling cylinder is fixed in the filler in its right position the control valve 58 is actuated by means of said foot-operated switch 30, thereby moving the piston 24 to the left by means of the pressure medium (see Fig. 4), and then the piston 20 pushes the material, pressed into the filling cylinder, through the mouth piece into a gut held in front of the mouth piece.

Once the filling cylinder is emptied the pressure medium is directed through the delivery pipe to the other side of the piston 24 by actuating the foot-operated switch 30 so that the piston 24 returns to its starting position. The pressure exerted between the frames 55, 57 is taken up by the tie rods 29. Then the empty cylinder 13" is rolled over the pair of levers 41 to the bottom trackway 37, and on it returned to the press. The filled gut is then sectioned by binding and further treated in known manner.

Figure 8:
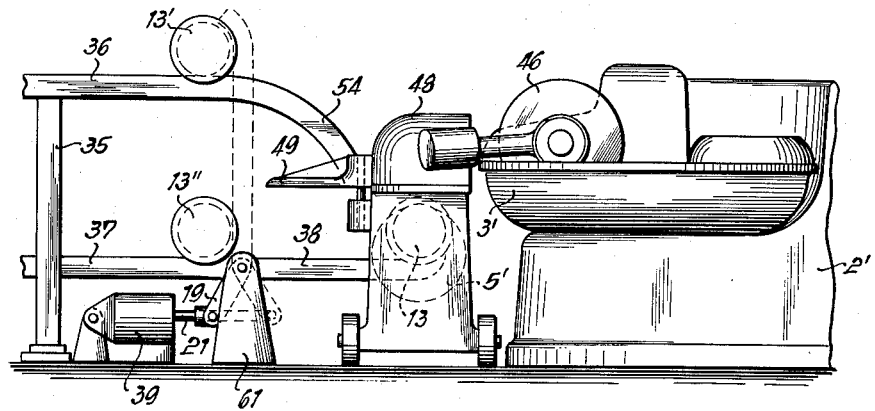
Fig. 8 is an elevational view of an apparatus for processing of meat, in which a meat cutter and a press of modified construction are employed.
Figure 9:
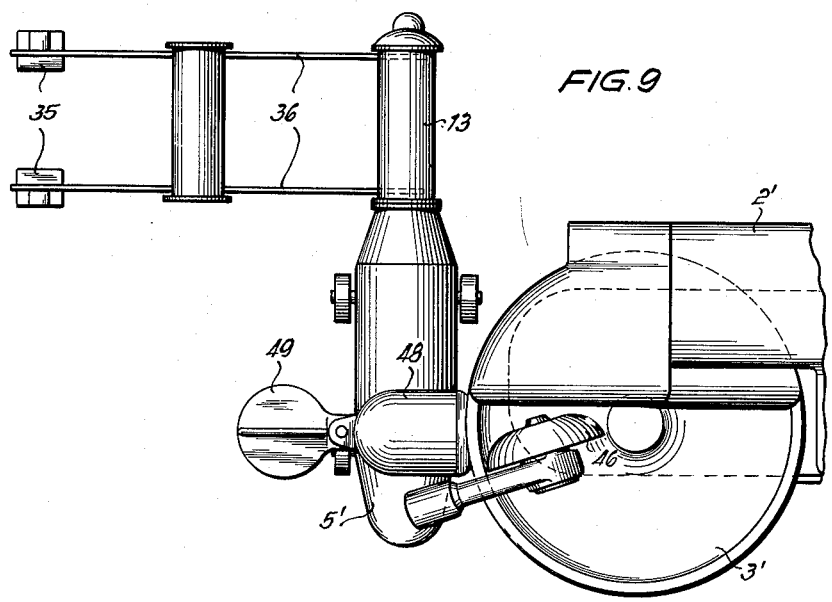
Fig. 9 is a plan view of the apparatus of Fig. 8 with certain parts omitted.

Figs. 8 and 9 illustrate the arrangement according to the invention as applied to a different construction of a meat cutter 2'. In this case the pan-shaped container 3' is emptied across its edge by means of an ejector 46 which is secured to the baling press 5' set up before the cutter. The press 5' is modified corresponding to the construction of the cutter 2'. It is provided with a filling funnel 48 with which a cover 49 is connected. The adjustment, filling, releasing, transporting and emptying operations for the filling cylinders are carried out as previously described.

Figure 3A:
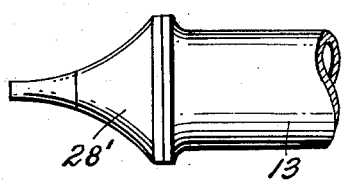
Fig. 3a is a sectional detail view of a modified filling cylinder.

The construction of the filling cylinders may be modified to the effect that a cover 28' is inserted at the left end of the cylinder 13 which cover may be shaped as is conventional to form a mouthpiece as shown in Fig. 3a. In addition, it may be advisable not to restore normal atmospheric pressure within the entire hollow enclosure formed by the cylinder to be filled and by the press housing 5' after said cylinder has been filled with said material, but to rather maintain a low pressure within the hermetically sealed baling press housing while the removal of the filled cylinder takes place and another cylinder to be filled is attached to the press housing 5'.

To this end the blade 18 may further carry a thin disc 18a, indicated in broken lines in Fig. 2, which seals off the discharge opening 60 of the press after the material is cut off by blade 18.

Figure 10:
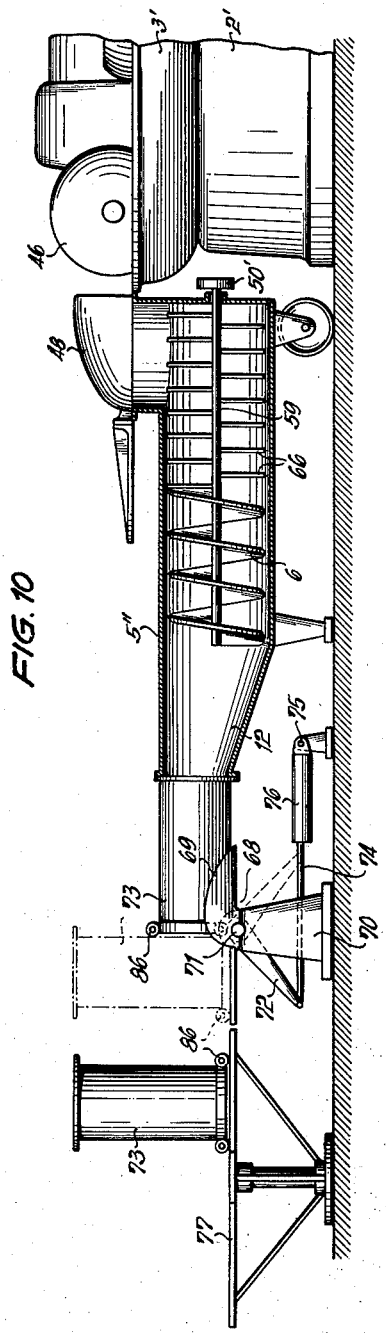
Fig. 10 is a partial sectional view of an apparatus for processing of meat, equipped with a cutter, a press with a vacuum mixing device and a turnstile for transporting the filling cylinders.

In the arrangement illustrated in Fig. 10 a cutter 2' of the same type as illustrated in Figs. 8 and 9 is used. The housing of the press 5" is somewhat extended as compared with that heretofore described.

The extended part of the press housing which is provided with the filling funnel 48 is constructed as a vacuum mixing device in such a way that mixing blades or fins 66 are arranged on the extended conveyor shaft 59. The drive 50' for the conveyor shaft can be used for right hand and left hand rotation, selectively. Provided that the conveyor exerts pressure when rotating in the right hand direction, the conveyor shaft is driven in the left hand direction for commingling and mixing, so that during this latter operation the conveyor proper remains inactive.

The filling cylinders 73 rest in a swivelling device 68 which swivels the cylinders, after they are filled—which filling operation takes place in substantially horizontal position—into a vertical position. The device 68 comprises two standards or frames 70 with an axle 71 mounted therebetween. A holding device 69 is secured to this axle which receives one of the cylinders to be filled. A lever 72 is rigidly connected with this holding device, and the other end of this lever is engaged by a rod 74 of a pressure piston. This pressure piston performs a reciprocating movement within a pressure cylinder 76 which is swively mounted about an axle 75. In the position as illustrated in Fig. 10 the piston is shown in the left hand part of the cylinder. Under the impact of the pressure medium, e.g. compressed air, the piston moves toward the right and consequently the lever 72 occupies the position indicated in dotted lines, and the holding device 69 is swung from its horizontal into a vertical position.

The filling cylinders 73 (Fig. 12) are provided at one of their faces with rollers 86 by means of which they can be rolled on rails which are formed and arranged accordingly. In addition, disc-like covers (not shown) are detachably arranged at both ends of the filling cylinders to prevent the material within the filling cylinders from any escape therefrom when being transported.

Figure 12:
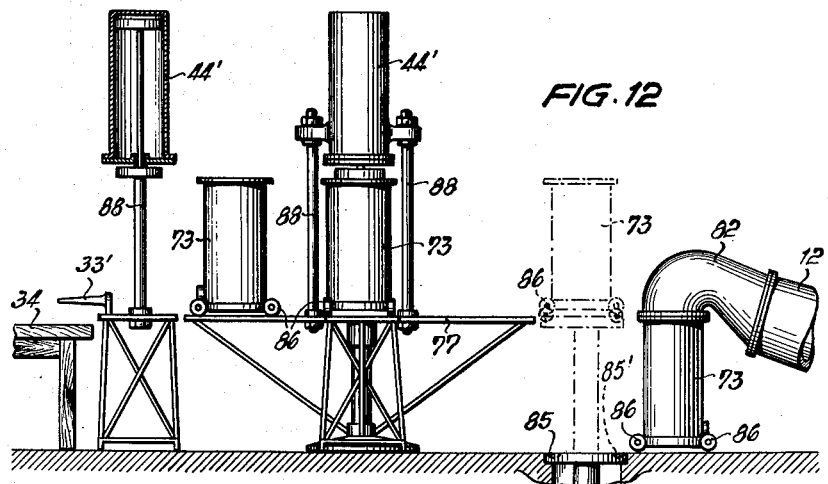
Fig. 12 is a side elevational view with parts shown in section of a turnstile and three filler means for producing sausages having vertically-acting pistons.

Next to the swivelling device 68 (Fig. 10) a turnstile 77, having for example four arms, is arranged, and on it the full cylinders are moved from the swivelling device or press in front of a correspondingly arranged filler for sausages 44' (Fig. 12).

After the chopped or cut material has been transported from the pan or container 3' to the mixer space of the press, and after the housing of said press has been closed, the conveyor shaft is driven in left hand direction so that the mixer blades rotating through the material loosen the latter equally, thus allowing air included or caught therein to escape. During this process the conveyor 6 remains inactivated, as its pitch is such as to affect the material only when the conveyor shaft is driven in right hand direction.

After the mixing process is terminated the direction of rotation of the conveyor shaft is reversed so that the conveyor now catches the material from which the air has been removed and presses it through the funnel-shaped part 12 into the filling cylinder 73. The filled up cylinder is then brought into vertical position by means of the swivelling device and pushed by hand onto the turnstile next to it which transports the filling cylinders to the fillers and after they have been emptied returns them to the press.

Figure 11:
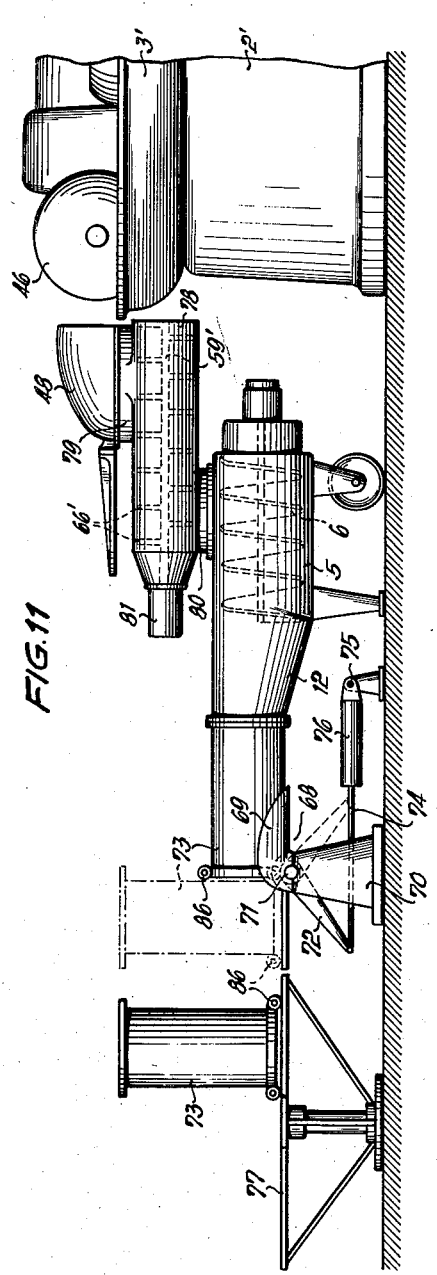
Fig. 11 is a view similar to that of Fig. 10, in which the vacuum mixing device is shown separately arranged adjacent the press.

In the arrangement illustrated in Fig. 11, again a cutter with a pan-shaped container 3' is used which has to be emptied over its rim edge by means of the ejector 46. The press 5 used in this arrangement essentially corresponds to the one used in the arrangement as illustrated in Fig. 1. In this case the vacuum mixing device is arranged separately from the press 5.

The vacuum mixing device 78 comprises an approximately horizontal cylindrical housing which is provided on its right hand end (Fig. 11) with an upwardly directed inlet 79 which can be sealed off hermetically and on its left hand end (Fig. 11) with a downwardly directed outlet 80 which can equally be sealed off hermetically. The outlet 80 is located above the inlet of the press 5 so that after the mixing process is terminated and the aforesaid outlet is opened the mixed material is directly supplied to the press. On the left hand end in Fig. 11 an electromotor 81 is flanged to the housing which is driven by the shaft 59' carrying the mixing blades 66'.

Figure 13:
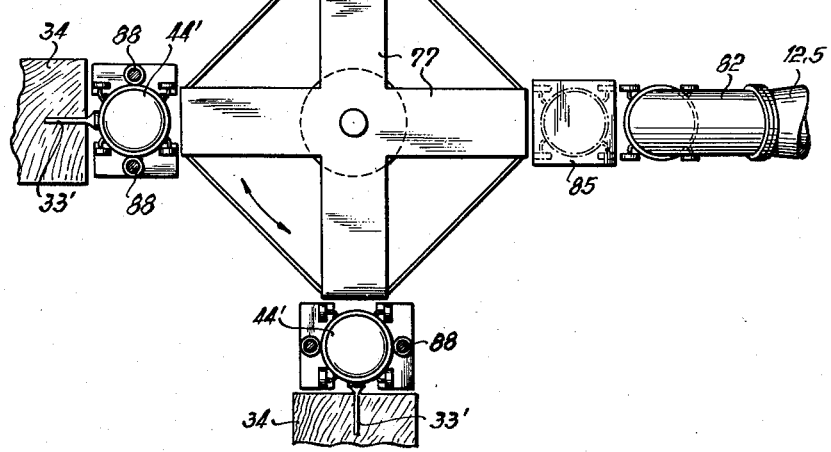
Fig. 13 is a top plan view of the arrangement of Fig. 12.

In the arrangement illustrated in Figs. 12 and 13 no swivelling device is used, and the filling cylinders 73 are immediately filled in vertical position. In order to achieve this an elbow 82 is connected with the funnel-shaped part 12 of the press. Beneath the mouth of the press there is always set up one filling cylinder to be filled. For pushing the full cylinders on the turnstile 77 a pneumatically or hydraulically actuated lifting device is installed next to the turnstile in the floor.

This lifting device comprises a cylinder 83 and a piston 84 reciprocably moving therein, said piston carrying on its upper end a plate 85 provided, for example, with recesses 85' corresponding in shape of rollers 86 of the filling cylinders. The plate may be provided with additional safety devices to prevent the filling cylinders from falling down when they are lifted. If the empty filling cylinders are too heavy to be lifted by hand off the fillers or the turnstile, the lifting device can also be used for lowering the cylinders after they have been returned by the turnstile to the lifting device.

The fillers 44' for sausages are provided with vertically acting pressure pistons. Essentially, these fillers are of the same construction as those having a horizontally acting pressure piston, as illustrated in Fig. 4.

Figure 14:
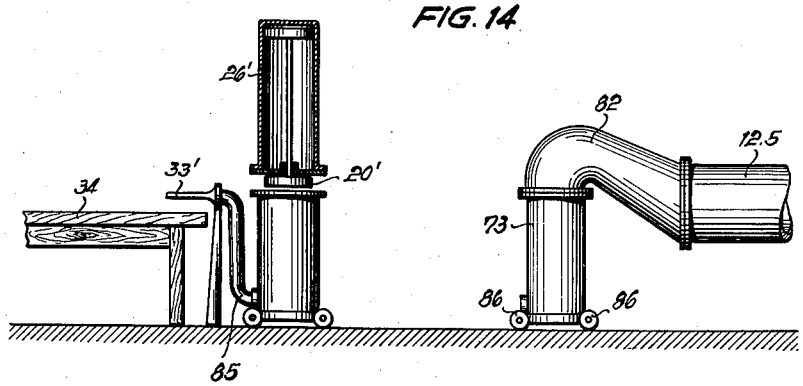
Figs. 14 and 15 are fragmentary views in section of portions of the invention with fillers coordinated thereto without the need of an additional turnstile.
Figure 15:
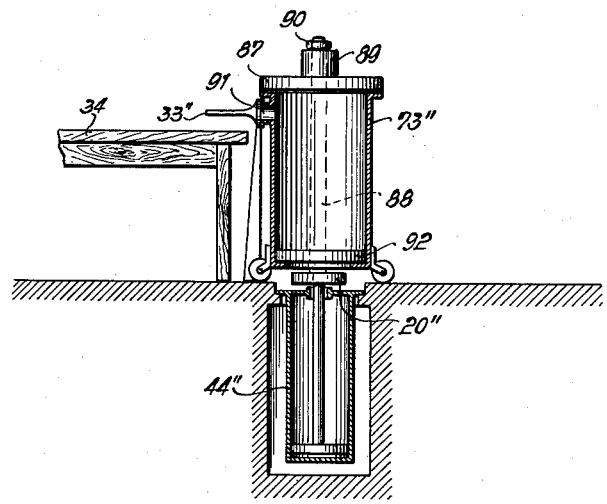

Figs. 14 and 15 show two arrangements similar to those illustrated in Figs. 12 and 13, however, with the turnstile disposed between the press and the filler, consequently the lifting device being omitted.

In this case the filling cylinders provided with rollers are directly transported along the floor from the press to the individual fillers. In the arrangement according to Fig. 14 the pressure cylinder 26' of the filler is arranged so that the piston 20' penetrates from above the filling cylinder and pushes the material through the discharge aperture arranged at its lower end. A rising pipe 85 is connected with this discharge aperture and secured to the filler, which carries at its upper end a mouthpiece 33' which is bent in horizontal direction.

The arrangement in Fig. 15 differs from that in Fig. 14 in that the filler 44" is recessed in the floor surface so that the piston 20″ presses from below into the filling cylinder 73″. The filling cylinder used in this arrangement is provided with a loose bottom 86 which moves upwardly with the piston 20″ pressing against it.

Before the material is to be pressed out, the filling cylinder is covered at its upper end with a cover 87. To fix the cover, one tie rod 88 is provided in front of and one behind the cylinder (Fig. 15) on which a crosspiece 89 is slidably guided up and down which under the influence of nuts 90, screwed on the tie rods, presses the cover 87 onto the filling cylinder. An outlet 91 is located directly beneath the upper edge of the filling cylinder, with which outlet a mouth piece 33″ is connected.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A system for processing of meat and like food, comprising a press for comminuted material and being provided with an enclosure having a discharge end, a filling cylinder for receiving said material and removably connected to said discharge end of said enclosure, an air pump, and pipe means connecting said enclosure and said cylinder with the vacuum side of said air pump, said pipe means removing air from said enclosure and said cylinder, discharge means for discharging food from said cylinder, conveyor means between said discharge means and said discharge end for conducting said cylinder from said discharge end to said discharge means and for returning said cylinder from said discharge means to said discharge end, pivotable means situated adjacent said discharge end for swingably transferring said cylinder from said discharge end onto said conveyor means, said pivotable means supporting said cylinder during said swinging operation so that food is filled into said cylinder and the latter transferred by said pivotable means to said conveyor means and transported thereby to discharge means, said cylinder being discharged at said discharge means so that said cylinder when thus discharged may be returned to said discharge end via said conveyor means.

2. A system for processing of meat and like food, comprising a press for comminuted material and being provided with an enclosure having a discharge end, a filling cylinder for receiving said material and removably connected to said discharge end of said enclosure, an air pump, and pipe means connecting said enclosure and said cylinder with the vacuum side of said air pump, said pipe means removing air from said enclosure and said cylinder, a processing component for discharging food from said cylinder, an upper trackway between said discharge end and said processing component for conducting said cylinder from said discharge end to said processing component, a lower trackway between said processing component and said discharge end for conducting said cylinder from said processing component to said discharge end, pivot means for swinging a portion of said lower trackway located adjacent said discharge end toward said upper trackway, said lower trackway portion supporting said cylinder during said swinging operation, said upper trackway receiving said cylinder when the latter is moved by said lower trackway portion toward said upper trackway, track arm means pivotally carried by said upper trackway and located adjacent said processing component, said track arm means guiding said cylinder downwardly from said upper trackway toward said processing component, and pivoted lever means located adjacent said processing component for guiding said cylinder from said processing component to said lower trackway so that food processed at said discharge end may be filled into said cylinder and the latter lifted by said lower trackway portion to said upper trackway and transported to said processing component, said cylinder being discharged at said processing component, whereby said cylinder when thus discharged may be returned to said discharge end via said lower trackway.

3. The system of claim 2, said cylinder being open at both ends.

References Cited in the file of this patent
UNITED STATES PATENTS

| | | |
|---|---|---|
| 227,283 | Moore | May 4, 1880 |
| 262,575 | Crosby | Aug. 15, 1882 |
| 688,231 | Ayars | Dec. 3, 1901 |
| 2,427,202 | Dyrek et al. | Sept. 9, 1947 |
| 2,452,666 | Kuther et al. | Nov. 2, 1948 |
| 2,502,611 | Weier | Apr. 4, 1950 |
| 2,602,578 | Carruthers | July 8, 1952 |
| 2,681,279 | Sloan et al. | June 15, 1954 |
| 2,690,970 | Moses | Oct. 5, 1954 |
| 2,701,674 | Christiansen | Feb. 8, 1955 |